United States Patent
Hasegawa

(10) Patent No.: US 10,029,636 B2
(45) Date of Patent: Jul. 24, 2018

(54) RADIATOR SCREEN DEVICE, RADIATOR SCREEN UNIT, AND INDUSTRIAL VEHICLE

(71) Applicant: KABUSHIKI KAISHA TOYOTA JIDOSHOKKI, Kariya-shi, Aichi-ken (JP)

(72) Inventor: Manabu Hasegawa, Aichi-ken (JP)

(73) Assignee: KABUSHIKI KAISHA TOYOTA JIDOSHOKKI, Kariya-shi, Aichi-ken (JP)

( * ) Notice: Subject to any disclaimer, the term of this patent is extended or adjusted under 35 U.S.C. 154(b) by 0 days.

(21) Appl. No.: 15/465,904

(22) Filed: Mar. 22, 2017

(65) Prior Publication Data

US 2017/0274853 A1    Sep. 28, 2017

(30) Foreign Application Priority Data

Mar. 24, 2016  (JP) .................................. 2016-059999

(51) Int. Cl.
| | |
|---|---|
| *B60R 19/52* | (2006.01) |
| *B60K 11/04* | (2006.01) |
| *B60K 11/06* | (2006.01) |
| *F01P 11/12* | (2006.01) |

(52) U.S. Cl.
CPC .............. *B60R 19/52* (2013.01); *B60K 11/04* (2013.01); *B60K 11/06* (2013.01); *F01P 11/12* (2013.01)

(58) Field of Classification Search
CPC ... B60R 19/52; B60R 19/54; B60R 2019/525; B60K 11/04; B60K 11/06; B60K 11/08; F01P 11/12

USPC ................................................. 180/68.4, 68.6
See application file for complete search history.

(56) References Cited

U.S. PATENT DOCUMENTS

| | | | | |
|---|---|---|---|---|
| 1,399,859 A | * | 12/1921 | Garver | B60R 19/52 |
| | | | | 160/DIG. 1 |
| 1,496,661 A | * | 6/1924 | Dreier | B60R 19/52 |
| | | | | 165/134.1 |
| 4,443,236 A | * | 4/1984 | Peiler | F01P 11/12 |
| | | | | 180/68.1 |
| 5,785,139 A | * | 7/1998 | Freedy | B60K 11/04 |
| | | | | 180/68.1 |
| 7,370,690 B2 | * | 5/2008 | Rasset | F28D 1/0435 |
| | | | | 165/140 |

(Continued)

FOREIGN PATENT DOCUMENTS

| | | |
|---|---|---|
| JP | 2002-058939 A | 2/2002 |
| JP | 2004-225624 A | 8/2004 |
| JP | 2016-010766 A | 1/2016 |

*Primary Examiner* — John D Walters
(74) *Attorney, Agent, or Firm* — Sughrue Mion, PLLC

(57) ABSTRACT

A radiator screen device for a radiator includes at least one body formed of a wire and having a planar lattice structure. The at least one body has such a size that covers a cooling air in-take surface of the radiator, being disposed on an upstream side of the radiator with respect to a flowing direction of cooling air. The at least one body is disposed upstream of the radiator and faces the cooling air in-take surface. The at least one body captures part of stringy substances and orient lengthwise directions of remaining stringy substances along the flowing direction of the cooling air. A radiator screen unit includes the radiator screen device and a fan disposed downstream of the radiator. An industrial vehicle includes the radiator, the radiator screen device, and a fan disposed downstream or upstream of the radiator.

3 Claims, 9 Drawing Sheets

(56) References Cited

U.S. PATENT DOCUMENTS

| 7,946,367 B2* | 5/2011 | Good | B01D 46/0056 |
| | | | 180/68.1 |
| 2005/0029028 A1* | 2/2005 | Steinmacher | B60R 19/52 |
| | | | 180/68.6 |

* cited by examiner

RADIATOR SCREEN DEVICE, RADIATOR SCREEN UNIT, AND INDUSTRIAL VEHICLE

BACKGROUND OF THE INVENTION

The present invention relates to a radiator screen device that prevents a radiator for an industrial vehicle including a construction machine and an agricultural machine from being clogged. The invention also relates to a radiator screen unit that includes the radiator screen device and a fan, and an industrial vehicle having the radiator screen unit.

An industrial vehicle such as a forklift truck is driven by an internal combustion engine having a radiator for cooling coolant circulating in the engine. Unlike general vehicles, in the case of an industrial vehicle such as a construction machine and an agricultural machine, the effect of cooling the internal combustion engine operating under a high load by the wind of air caused by traveling of the vehicle cannot be expected. In order to provide effective cooling, a flow of cooling air with a wind velocity of about 10 meters per second is generated by using a fan so as to flow through the radiator. Dust accumulated in the radiator causes the radiator to be clogged, which prevents the coolant to be cooled appropriately. As a result, the internal combustion engine may overheat. It is noted that the term of industrial vehicle appearing in the description includes a construction machine and an agricultural machine.

An industrial vehicle such as a forklift truck may be operated in a dusty environment. For example, in a wood processing factory, a forklift truck is operated in an environment in which a large amount of stringy wood debris of various sizes is present on the floor. The industrial vehicle working in such an environment tends to overheat because of the radiator being clogged with dust. When the engine is overheated, it is difficult for an operator to remove and clean the radiator. To prevent such trouble, in general, a screen is disposed upstream of the radiator so as to capture dust. In the event of an overheat, the operator may remove and clean the screen. The screen needs to be cleaned periodically. Since the industrial vehicle remains idle during cleaning of the screen, it is desired to reduce the cleaning frequency for improving the working efficiency of the vehicle.

Japanese Patent Application Publication No. 2016-10766 (JP '766) discloses an air-intake device for preventing foreign substances from being taken in with the air. The air-intake device has a rotatable conical filter formed of a perforated plate. The conical filter is driven by a motor and a fan is connected to the filter for rotation therewith. Cleaning of the filter is accomplished by removing dust by centrifugal force of the rotating filter and scraping foreign substances accumulated on the surface of the rotational filter by using cleaning blades. Thus, cleaning of the rotating filter is performed automatically.

Japanese Patent Application Publication No. 2002-58939 (JP '939) discloses an exhaust gas purifying apparatus including a plurality of plate filters that are laminated in the direction in which exhaust gas containing particulates flows. Each plate filter is perforated or has therein small holes that are formed bored in the direction in which exhaust gas flows. The holes are formed through the respective plate filters so that the size of the holes is reduced in the flowing direction of the exhaust gas. Thus, particulates of various sizes are dispersedly captured by the respective plate filters so that clogging of the filters in a short time is prevented.

The intake device of JP '766 that removes foreign substances by centrifugal force and by scraping foreign substances from the surface of the rotating conical filter by using cleaning blades is disadvantageous over a plate filter in that the filter of a conical shape occupies a larger space. In the structure in which foreign substances are removed by centrifugal force, the entire radiator need be covered so that foreign substances flown by centrifugal force are prevented from flowing into the radiator, with the result that a large space is required in a vehicle for mounting the rotational conical filter. Furthermore, in order for the circular shape of the rotational filter as seen in front view thereof to cover the rectangular upstream surface of a radiator, the rotational filter needs an area that is considerably larger than the area of the upstream surface of the radiator, which makes the rotational filter difficult to be installed in an industrial vehicle.

In the case of the exhaust purification apparatus of JP '939 having a plurality of the plate filters having mesh sizes that are different from one of filter from another, each plate filter captures particulates of a predetermined range of sizes. If the particulate size distribution is uniform, the particulate of various sizes may be captured uniformly by the filters. If particulates of any specific range of sizes are larger, the plate filter corresponding to the specific range of size is clogged earlier than other plate filters.

The present invention which has been made in light of the above problems is directed to providing a radiator screen device that presents a radiator for an industrial vehicle including a construction machine and an agricultural machine from being clogged with substances in the form of a string and having different lengths and that prolongs the time before the engine overheats and hence the operation time of the industrial vehicle. The present invention is directed also to providing a radiator screen unit that includes the radiator screen device and a fan, and to providing an industrial vehicle that has the radiator screen unit and saves the installation space in the industrial vehicle.

SUMMARY OF THE INVENTION

In accordance with a first aspect of the present invention, there is provided a radiator screen device for a radiator of an industrial vehicle including a construction machine and an agricultural machine. The radiator screen device includes at least one body formed of a wire and having a planar lattice structure. The at least one body has such a size that covers a cooling air in-take surface of the radiator. The cooling air in-take surface is disposed on an upstream side of the radiator with respect to a flowing direction of cooling air. The at least one body is disposed upstream of the radiator and faces the cooling air in-take surface. The at least one body is configured to capture part of a plurality of stringy substances contained in the cooling air and orient lengthwise directions of remaining stringy substances along the flowing direction of the cooling air.

In accordance with a second aspect of the present invention, there is provided a radiator screen unit for a radiator of an industrial vehicle including a construction machine and an agricultural machine. The radiator screen unit includes a radiator screen device including at least one body formed of a wire and having a planar lattice structure and a fan disposed downstream of the radiator with respect to the flowing direction of cooling air to generate cooling air. The at least one body has such a size that covers a cooling air in-take surface of the radiator. The cooling air in-take surface is disposed on an upstream side of the radiator with respect to a flowing direction of cooling air. The at least one body is disposed upstream of the radiator and faces the cooling air in-take surface. The at least one body is configured to capture part of a plurality of stringy substances contained in the cooling air and orient lengthwise directions of remaining stringy substances along the flowing direction of the cooling air.

In accordance with a third aspect of the present invention, there is provided an industrial vehicle including a construction machine and an agricultural machine. The industrial vehicle includes a radiator, a radiator screen device including at least one body formed of a wire and having a planar lattice structure, and a fan disposed on downstream or upstream of the radiator with respect to the flowing direction of cooling air to generate cooling air. The at least one body has such a size that covers a cooling air in-take surface of the radiator. The cooling air in-take surface is disposed on an upstream side of the radiator with respect to a flowing direction of cooling air. The at least one body is disposed upstream of the radiator and faces the cooling air in-take surface. The at least one body is configured to capture part of a plurality of stringy substances contained in the cooling air and orient lengthwise directions of remaining stringy substances along the flowing direction of the cooling air.

Other aspects and advantages of the invention will become apparent from the following description, taken in conjunction with the accompanying drawings, illustrating by way of example the principles of the invention.

BRIEF DESCRIPTION OF THE DRAWINGS

The invention together with objects and advantages thereof, may best be understood by reference to the following description of the presently preferred embodiments together with the accompanying drawings in which.

DETAILED DESCRIPTION OF THE EMBODIMENTS

Figure 1:
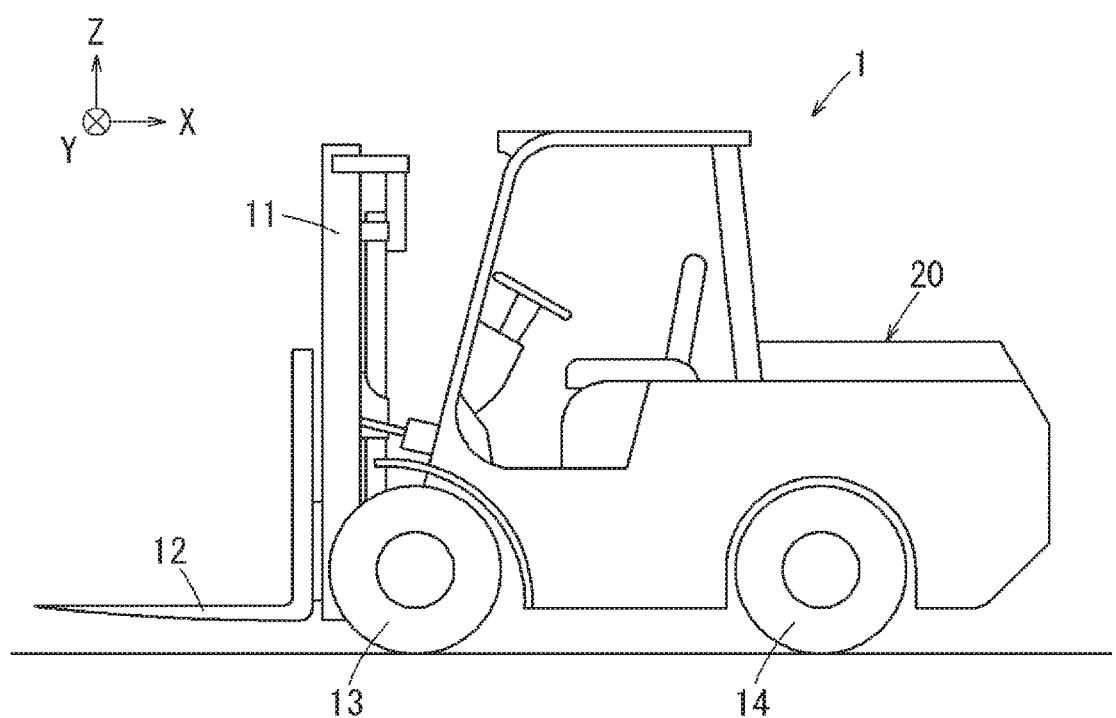
FIG. 1 is a schematic side view of a forklift truck as an industrial vehicle having a radiator screen device of a radiator screen unit according to an embodiment of the present invention.

The following will describe embodiments of the present invention with reference to accompanying drawings. In the drawings, arrows X, Y, and Z indicate rearward, rightward, and upward directions in an industrial vehicle which is designated by 1, respectively.

Figure 2:
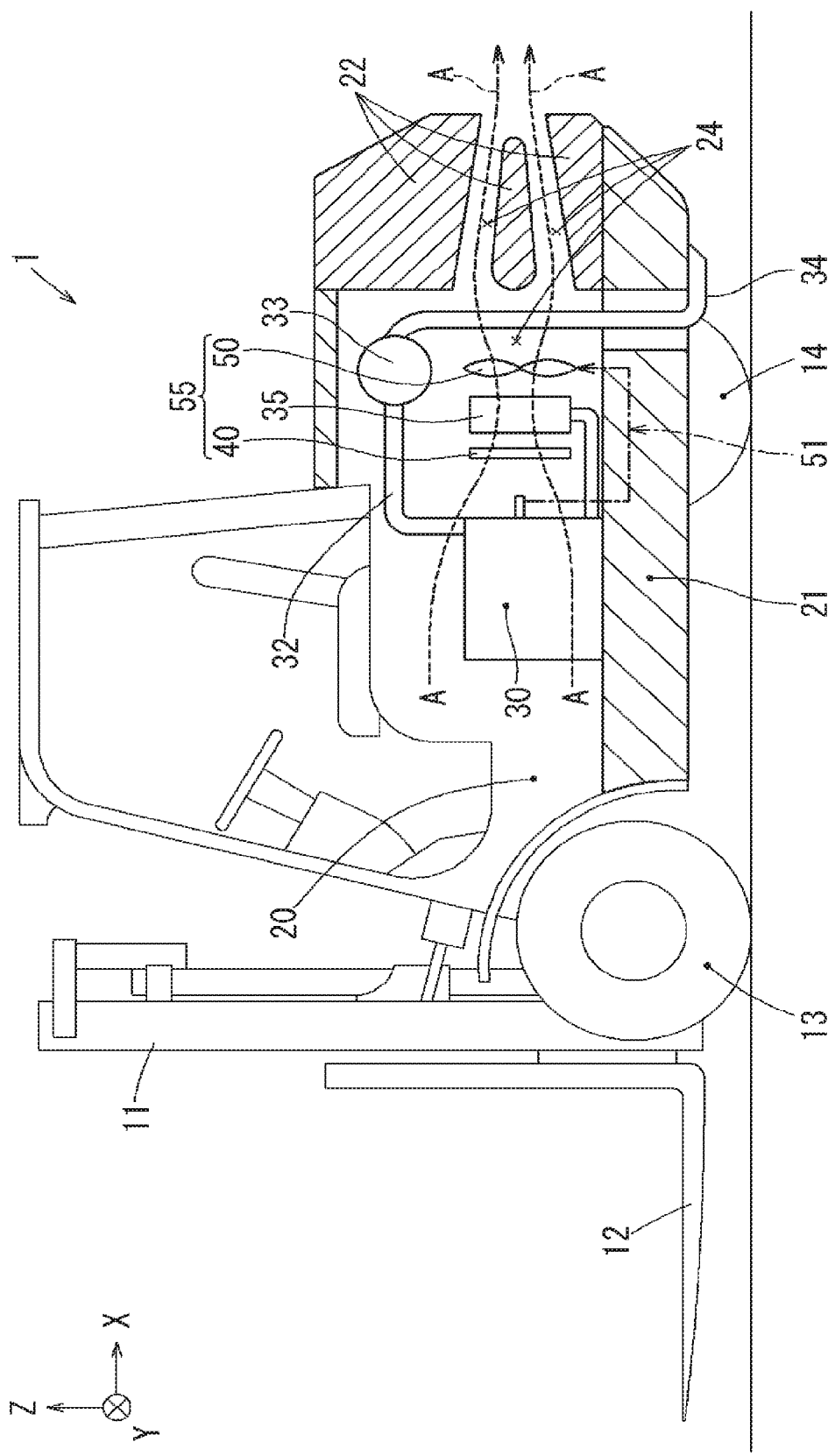
FIG. 2 is a partially sectional side view of the forklift truck of FIG. 1, showing a pull type radiator and its surrounding.
Figure 3:
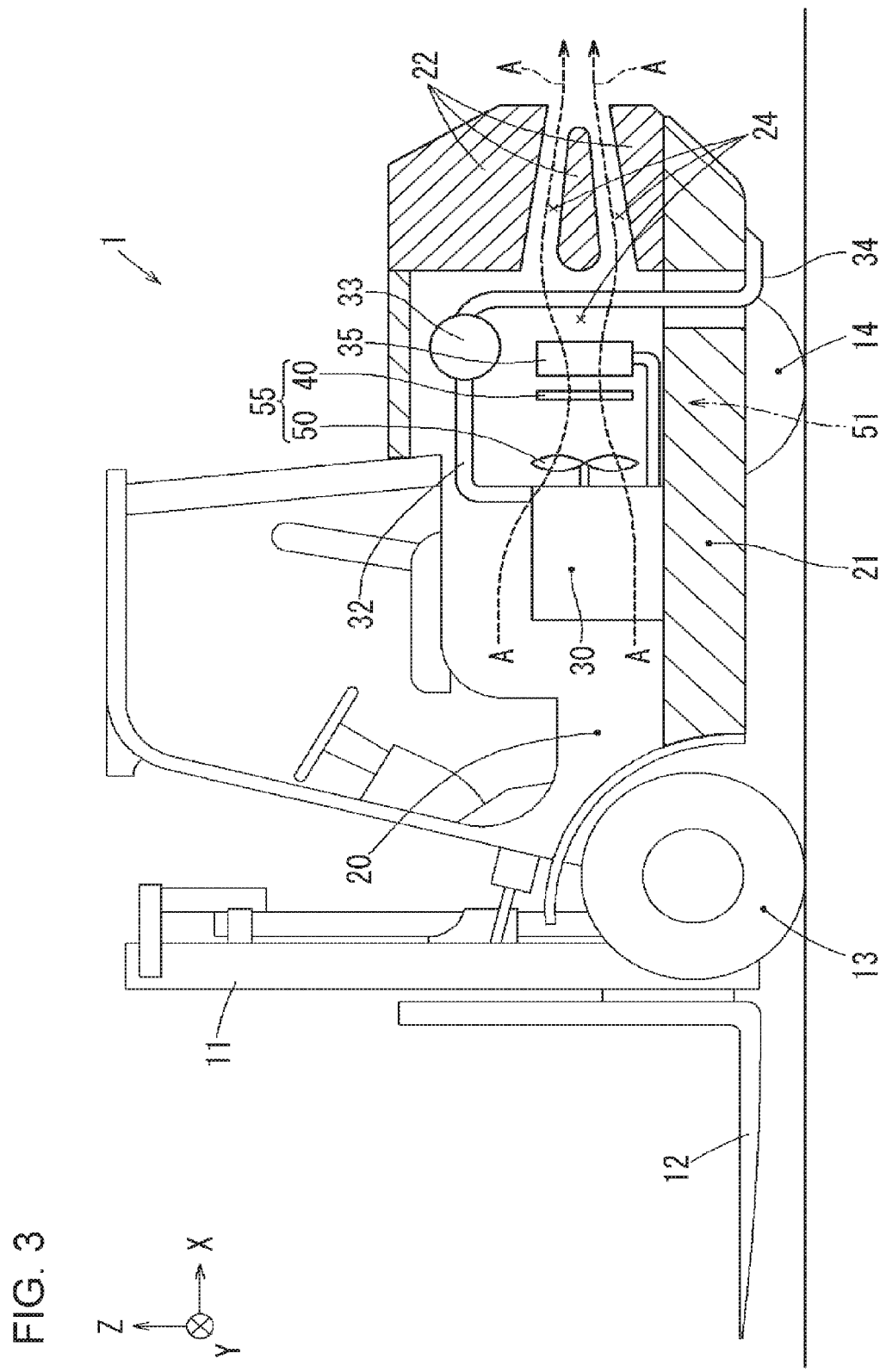
FIG. 3 is a partially sectional side view of the forklift truck of FIG. 1, showing a push type radiator and its surrounding.

Referring to FIGS. 1, 2, and 3, the following will describe the forklift truck 1 as an industrial vehicle having an internal combustion engine such as a diesel engine, according to an embodiment of the present invention. As shown in FIG. 1, the forklift truck 1 includes a vehicle body 20, a mast 11, a fork 12, a drive wheel 13, and a steerable wheel 14.

As shown in FIG. 2, the vehicle body 20 includes a vehicle body frame 21. An engine 30 and a counterweight 22 are mounted on the vehicle body frame 21. Exhaust gas from the engine 30 is discharged through an exhaust gas tube 32, an exhaust gas purifier 33, and an exhaust gas tube 34 outside the forklift truck 1. Coolant for cooling the engine 30 is circulated in the engine 30. A radiator 35 is provided for the cooling coolant. The engine 30 drives an oil pump (not shown) and hydraulic oil is pumped by the oil pump to operate the fork 12 and the mast 11.

As shown in FIG. 2, a radiator screen device 40, the radiator 35, and a fan 50 are arranged in this order rearward of the engine 30. The engine 30 drives to rotate the fan 50 through a power transmission device 51 such as a belt. The fan 50 generates cooling air indicated by A that flows rearward of the forklift truck 1 through the radiator screen device 40 and the radiator 35. A cooling air discharge passage 24 is formed around the radiator 35 and through the counterweight 22 to guide cooling air A rearward and outside the forklift truck 1. In the following description, the phrase of upstream side of the radiator 35 refers to the side where cooling air A flows toward the radiator 35 and the phrase of downstream side of the radiator 35 to the side where cooling air A flows away from the radiator 35.

In FIG. 2, the radiator screen device 40 is disposed upstream of the radiator 35. The fan 50 is disposed downstream of the radiator 35. The radiator screen device 40 and the fan 50 cooperate to form a radiator screen unit 55. It is noted that according to the present invention, the number of the radiator screen device may be plural. The fan 50 intakes air from the side of the radiator screen device 40 and the radiator 35 and causes cooling air A to flow through the radiator screen device 40 and the radiator 35. The arrangement in which the radiator screen device 40, the radiator 35, and the fan 50 are disposed in this order with respect to the flowing direction of cooling air A is called pull type.

As shown in FIG. 3, the radiator screen device 40 may be disposed upstream of the radiator 35 and the fan 50 may be disposed upstream of the radiator screen device 40. As with the case of FIG. 2, the radiator screen device 40 and the fan 50 cooperate to form the radiator screen unit 55. As will be described later, the number of the radiator screen device 40 may be plural. The fan 50 blows air toward the radiator screen device 40 to generate a flow of cooling air A through the radiator screen device 40 and the radiator 35. The arrangement of FIG. 3, in which the fan 50, the radiator screen device 40, and the radiator 35 are disposed in this order from the upstream side of the cooling air A is called push type. Although either of the pull type and the push type may be used, the pull type arrangement is preferable as will be described later.

In the push type arrangement shown in FIG. 3, the cooling air blown from the fan 50 tends to be spatially localized in a specific region of the radiator screen device 40. Accordingly, dust tends to be accumulated in limited region, so that there is a fear that cooling air fails to flow evenly through the entire surface of the radiator 35. In the pull type arrangement shown in FIG. 2, cooling air flow is generated in an extensive region of the radiator screen device 40 and the radiator 35, flowing through the entire surfaces of the radiator screen device 40 and the radiator 35, which helps to improve the cooling of coolant and capturing of dust. As compared with such push type, in the pull type radiator shown in FIG. 2, the radiator screen device 40 and the radiator 35 are disposed in the passage of cooling air A where the air flows straight and stably without causing spiral stream of air. The pull type arrangement is advantageous over the push type in that the dust or stringy substances may be oriented so that its longitudinal direction coincides with the flowing direction of cooling air, as will be described in detail later. The following description will focus on the pull type radiator. As mentioned earlier unlike a general vehicle, in the industrial vehicles such as a construction machine and an agricultural machine, the cooling effect for the internal combustion engines operated under a high load by the air flow caused by traveling of the vehicle is not expected. Therefore, the fan 50 generates a flow of cooling air A with a high wind velocity of dozens of meters per second.

That is, a fan is disposed downstream of the radiator. The fan intakes air and causes cooling air. In a fan disposed upstream of the radiator, the cooling air blown from the fan tends to be spatially localized in a specific region of the radiator screen device. Accordingly, dust tends to be accumulated in limited region. On the contrary, in a fan disposed downstream of the radiator, cooling air flow is generated in an extensive region of the radiator screen device and the radiator, flowing through the entire surfaces of the radiator screen device and the radiator, which helps to improve the cooling of coolant and capturing of dust. As compared with the fan disposed upstream of the radiator, in the fan disposed downstream of the radiator, the radiator screen device and the radiator are disposed in a passage of cooling air where air flows straight and stably without causing spiral stream of air. Therefore, stringy substances may be oriented so that its longitudinal direction coincides with the flowing direction of cooling air.

Figure 4:
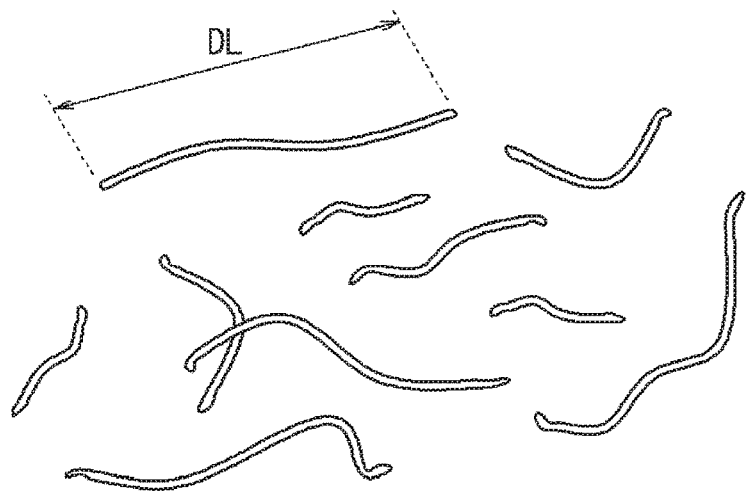
FIG. 4 is a schematic view showing dust or stringy substances, as an example, captured by the radiator screen device of FIGS. 2 and 3.
Figure 5:
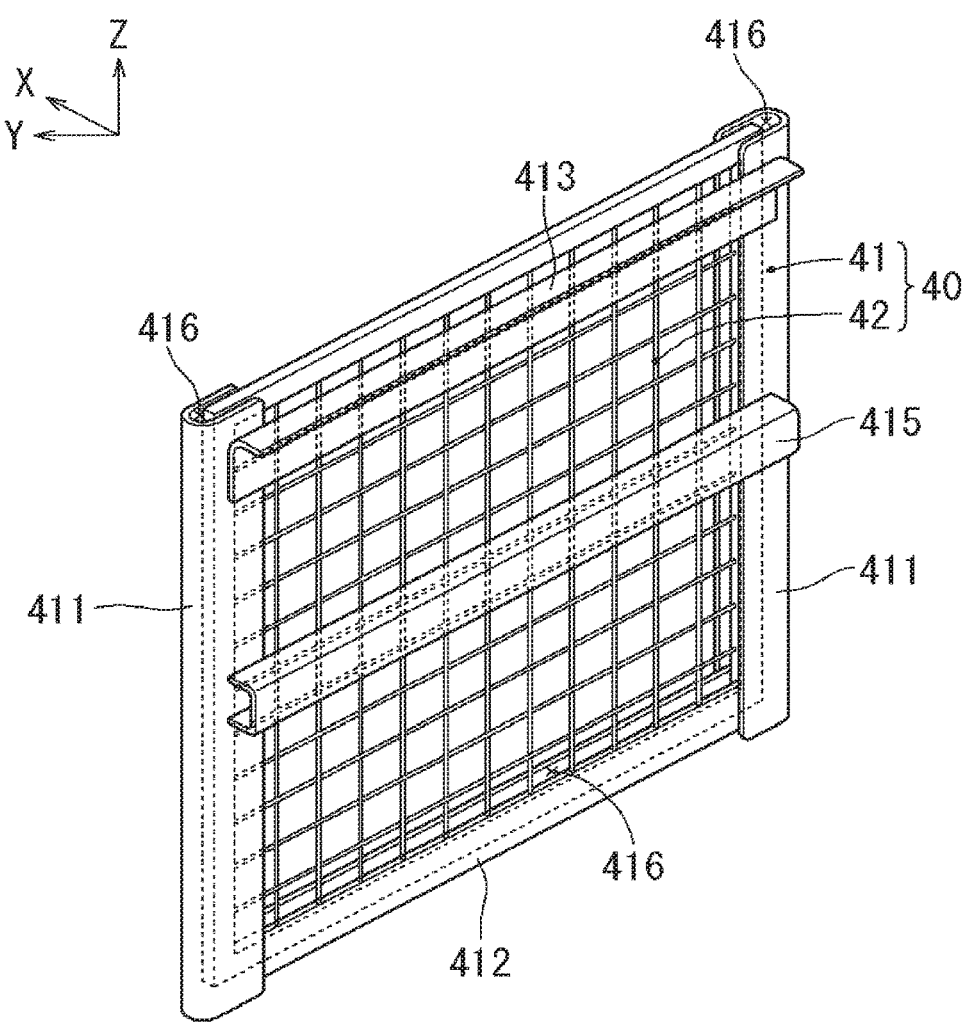
FIG. 5 is a perspective view of the radiator screen device of FIGS. 2 and 3, having a frame and a body.
Figure 6:
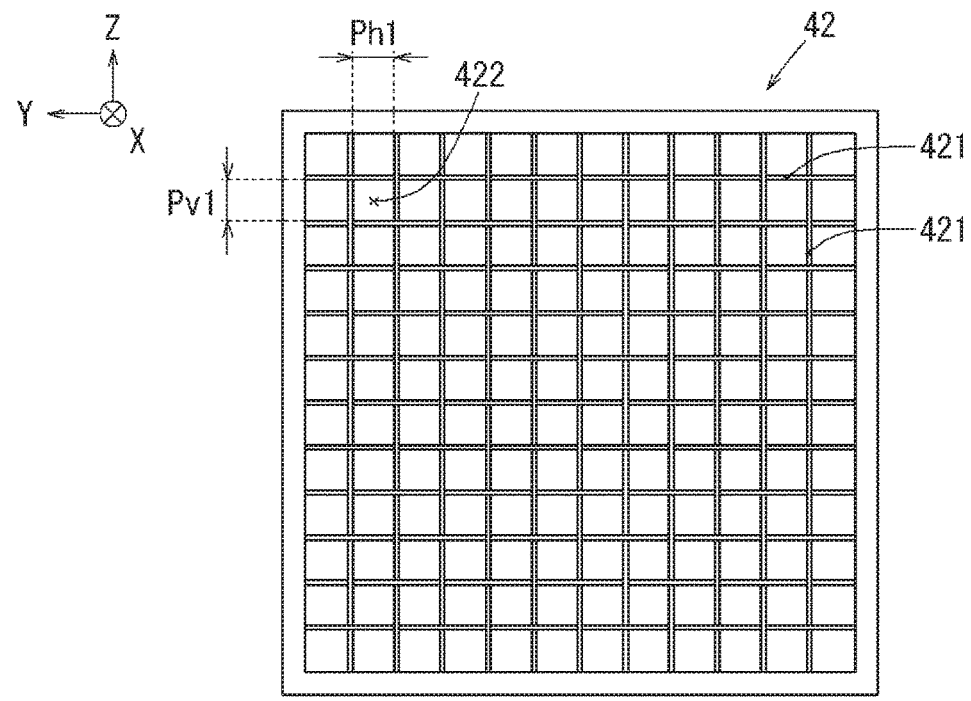
FIG. 6 is a front view of the body forming meshes, of the radiator screen device of FIG. 5.
Figure 7:
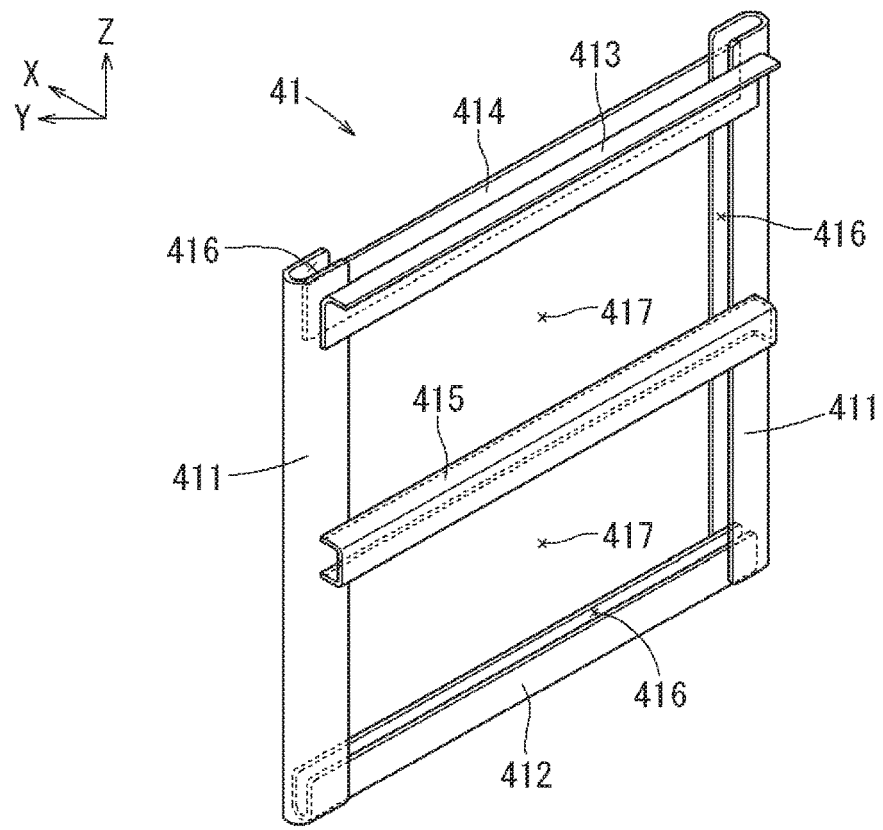
FIG. 7 is a perspective view of the frame of the radiator screen device of FIG. 5.

In the present embodiment, the object to be captured by the radiator screen device 40 shown in FIGS. 5, 6 and 7 includes stringy substances in the form of a string, as shown in FIG. 4. In the following description, the dust in the form of a string will be simply referred to as dust or as stringy substances. For example, in a wood processing factory, dust or wood debris having a thickness of about one millimeter and various lengths DL are present on the floor. Although the length DL of the stringy substance is about 20 millimeters at maximum, the thickness and length of the stringy substances in the present embodiment are not limited to specific values.

Referring to FIGS. 5 to 7, the following will describe the radiator screen device 40. FIG. 5 shows a perspective view of the radiator screen device 40 including the frame 41 and the body 42. FIG. 6 shows a front view of the body 42. FIG. 7 shows a perspective view of the frame 41. As shown in FIG. 7, the frame 41 includes a pair of side frame members 411 and a bottom frame member 412 that are made of a metal. As shown in FIG. 5, the frame members 411, 412 are assembled together so that the frame 41 is opened at the top. The side frame members 411 and the bottom frame member 412 are of a channel shape having a groove 416 facing inward of the frame 41. The frame 41 further includes reinforcement members 413, 414, 415 to enhance the rigidity of the frame 41 and has spaces 417 through which cooling air A flows.

As shown in FIG. 6, the body 42 is formed of wires 421 made of a metal and has a planar lattice structure. The body 42 has openings 422 forming the mesh. The mesh size of the body 42, which is indicated by Ph1 and Pv1, is set in accordance with the size and shape of the dust to be captured. In the case of the stringy substance having a length DL of about 20 millimeters at the maximum, the mesh size Ph1, Pv1 is set, for example, about six millimeters. The opening 422 may have a hexagonal shape. The wire 421 may be made of any appropriate material and have any diameter. As will be described later, the wire 421 may have any suitable shape.

The body 42 shown in FIG. 6 is set in the frame 41 shown in FIG. 7 by being inserted through and into the grooves 416 of the frame members 411, 412, thus the radiator screen device 40 shown in FIG. 5 being formed. The radiator screen device 40 is disposed in the forklift truck 1 as shown in FIG. 2. The structure of the radiator screen device 40 allows the operator of the vehicle to remove and mount the body 42 easily. In the event of overheating, the operator can remove the body 42 rapidly from the frame 41 for cleaning and replacing the cleaned body 42 in the frame 41.

Figure 8:
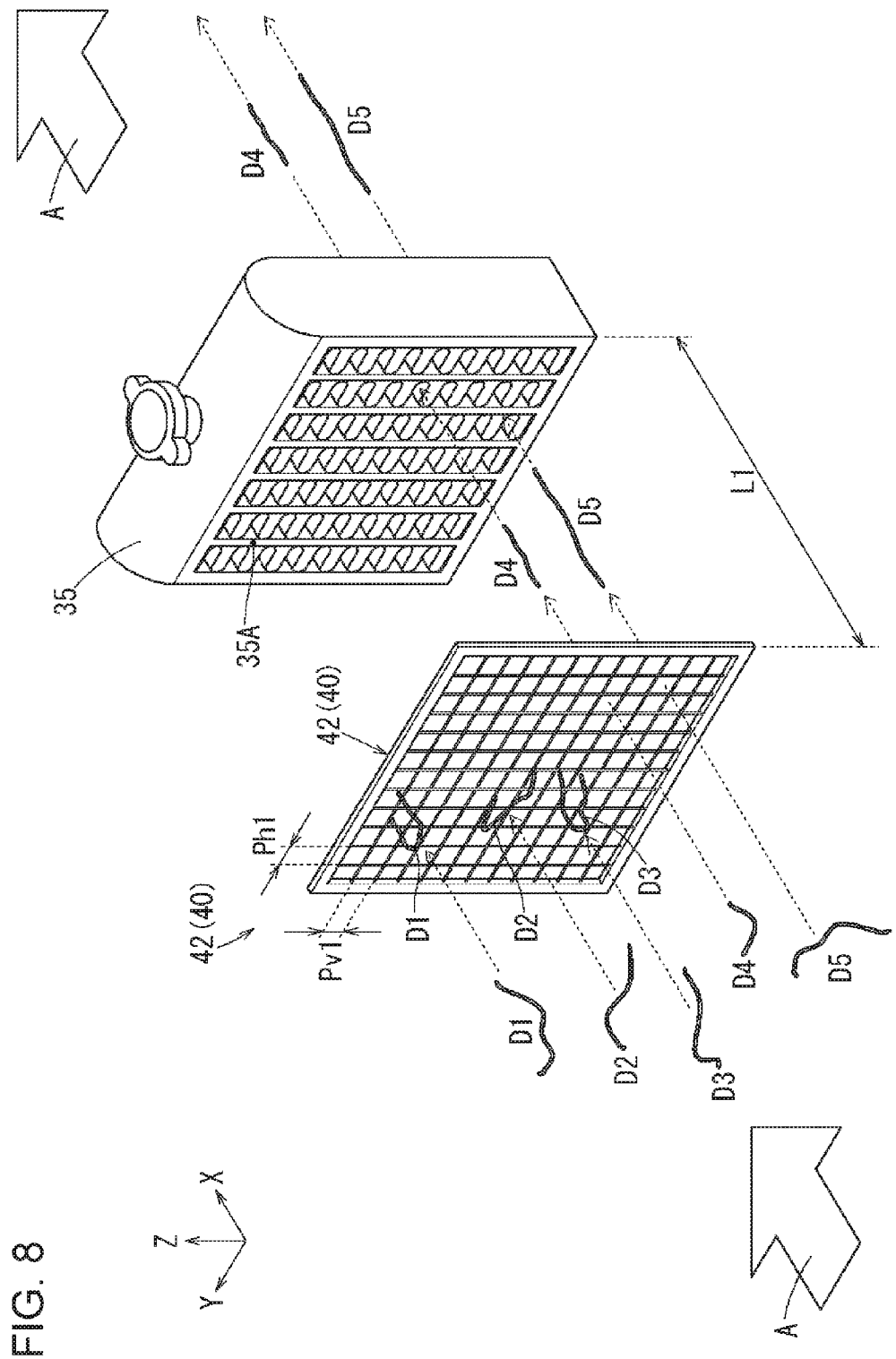
FIG. 8 is a perspective exploded view of the body and the radiator of the radiator screen unit of FIGS. 2 and 3, showing how the stringy substances contained in cooling air are captured by the screen.

As shown in FIG. 8, the flow of cooling air A generated by the fan 50 passes through the radiator screen device 40 and the radiator 35 for cooling the coolant in the radiator 35. The radiator screen device 40 which is disposed upstream of the radiator 35 has such a size that covers the cooling air in-take surface 35A that is disposed on the upstream side of the radiator 35 and faces the cooling air in-take surface 35A. The radiator screen device 40 of a planar shape has such a size that suitably covers the cooling air in-take surface 35A as described above. Such structure helps to save the space for mounting the radiator screen device 40 in an industrial vehicle. The distance L1 between the radiator 35 and the radiator screen device 40 may be appropriately set. In FIG. 8, the body 42 is shown with the frame 41 of the radiator screen device 40 omitted the illustration.

The following will describe the function of the radiator screen device 40 through which cooling air A containing stringy substances D1, D2, D3, D4, D5 flows from upstream of the radiator screen device 40. FIG. 8 shows how the stringy substances D1 to D3 are captured by the radiator screen device 40 and the stringy substances D4, D5 have been passed through the opening of the radiator screen device 40 without being caught. The stringy substances D4, D5 after being flowed through the opening of the radiator screen device 40 are oriented such that their lengthwise directions coincide with the flowing direction of the cooling air A. The stringy substances D1, D2, D3 whose lengthwise directions fail to be oriented along the flowing direction of the cooling air A are captured by the radiator screen device 40. That is, the stringy substances which are oriented such that their lengthwise directions coincide with the flowing direction of the cooling air A are passed through the opening of the radiator screen device 40.

The stringy substances D4, D5 that are passed through the opening of the radiator screen device 40 are oriented along the flowing direction of the cooling air A. Therefore, the stringy substances D4, D5 are passed through the spaces between cooling fins of the radiator 35 with cooling air A flowing at a high wind velocity of dozens of meters per second. Thus, very few stringy substances are accumulated on the radiator 35. The distance between the cooling fins of the radiator 35 is about two millimeters that is larger than the thicknesses of the stringy substances.

Specifically, part of the stringy substances contained in cooling air A is captured by and accumulated on the surface of the radiator screen device 40. The remaining stringy substances are flowed through the radiator screen device 40 and the radiator 35 and discharged through the cooling air discharge passage 24 outside the forklift truck 1. Thus, all the stringy substances contained in cooling air A are not captured on the radiator screen device 40, but part of the stringy substances is captured on the radiator screen device 40, and the remaining stringy substances are flowed through the radiator 35 and discharged outside the forklift truck 1. As compared with a case in which all stringy substances are caught by the radiator screen device 40, the time before the radiator screen device 40 is clogged and hence the time before overheat occurs may be prolonged. Accordingly, the operating time of the forklift truck 1 may be prolonged.

That is, the radiator screen device is formed of wires and has a planar lattice structure. The radiator screen device has such a size that suitably covers the cooling air in-take surface of the radiator and disposed upstream of the radiator. Such structure helps to save the space for mounting the radiator screen device in an industrial vehicle as compared with the intake device of JP '766. Regardless of sizes of stringy substances, part of stringy substances is captured on the radiator screen device and the remaining stringy substances are oriented along the flowing direction of the cooling air. In a case in which stringy substances are captured on the radiator screen device, clogging of the radiator is prevented because no stringy substance reaches the radiator. In a case in which stringy substances are flowed through the radiator screen device and oriented along the flowing direction of the cooling air, clogging of the radiator is prevented because the stringy substances are flowed through the radiator. Thus, as compared with a case in which all stringy substances are caught by the radiator screen device, since part of the stringy substances is captured on the radiator screen device and the remaining stringy substances are flowed through the radiator, the time before overheat occurs may be prolonged as compared with a case in which all string substances are caught by the radiator screen device.

Figure 9:
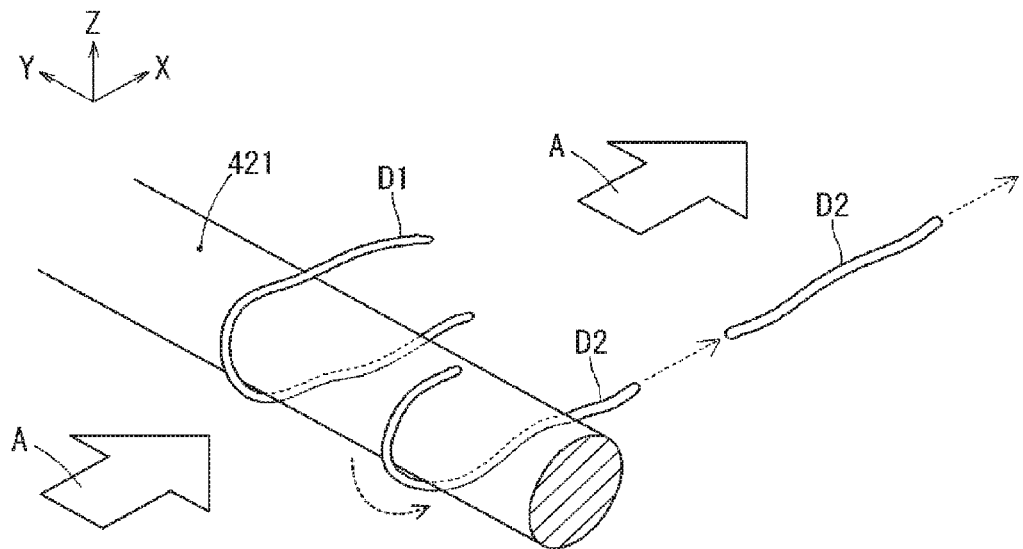
FIG. 9 is a fragmentary enlarged perspective view of a wire of the body of the radiator screen device, having a circular sectional shape, showing how stringy substances are captured by the wire and the stringy substances are oriented along the flowing direction of cooling air.
Figure 10:
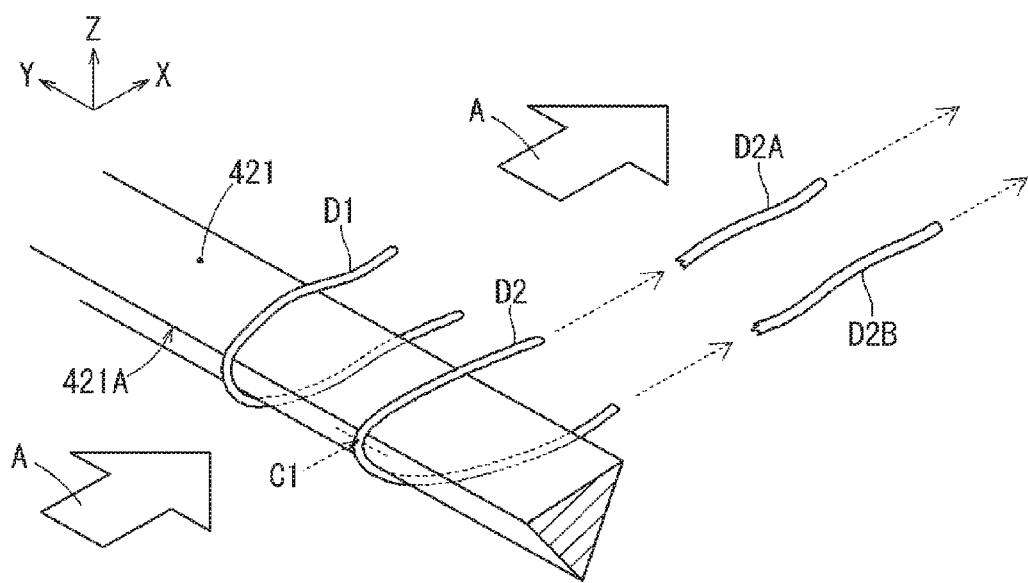
FIG. 10 is a fragmentary enlarged perspective view of a wire of the body of the radiator screen device, having a triangular sectional shape with an edge of the wire directed against the flowing direction of cooling air, showing how the stringy substances are captured and the stringy substances are oriented along the flowing of cooling air.
Figure 11:
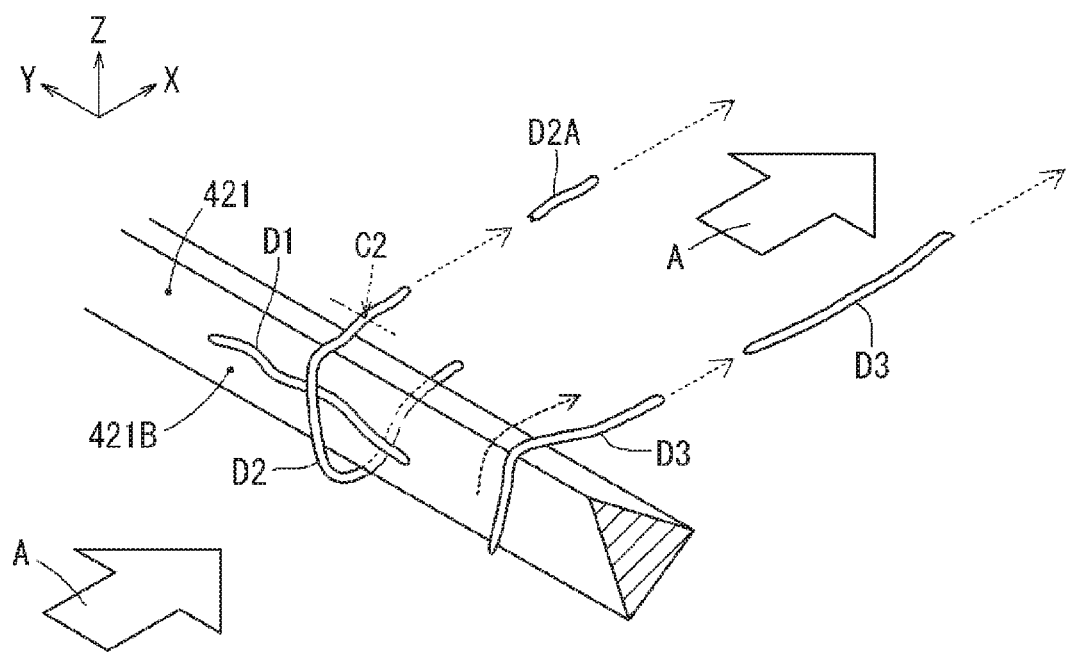
FIG. 11 is a fragmentary enlarged perspective view of a wire of the body of the radiator screen device, having a triangular sectional shape with a flat surface of the wire directed against the flowing direction of cooling air, showing how the stringy substances are captured and the stringy substances are oriented along the flowing direction of cooling air.

The following will describe the function of the radiator screen device 40 having a wire with reference to FIGS. 9 to 11. FIG. 9 shows a wire 421 having substantially a circular shape, including an ellipsoidal sectional shape and a state in which the stringy substances D1, D2 contained in cooling air A are captured by the wire 421. Cooling air A flowing at a high velocity of dozens of meters per second causes the ends of the stringy substances D1, D2 captured by the wire 421 to vibrate. Since the wire 421 has substantially a circular sectional shape, the vibrated stringy substance D2 slides off the peripheral surface of the wire 421. The stringy substance D2 removed from the wire 421 is oriented along the flowing direction of the cooling air A and flowed by cooling air A.

The following will describe the function of the radiator screen device 40 having the wire 421 having substantially a triangular sectional shape, including a polygonal sectional shape, with reference to FIG. 10. As shown in FIG. 10, the triangular cross section of the wire 421 has an edge 421A directed against the flow of cooling air A. FIG. 10 shows a state in which the stringy substances D1, D2 contained in cooling air A are captured by the wire 421. Cooling air A flowing at a high wind velocity of dozens of meters per second forces the stringy substances D1, D2 against the edge 421A of the wire 421. For example, the stringy substance D2 forced against the edge 421A is cut at C1 into two pieces D2A and D2B. The cut pieces D2A and D2B are oriented along the flowing direction of cooling air A and flowed toward the radiator 35 (not shown). Some stringy substances may slide off from the wire 421 as with the stringy substance D2 in FIG. 9. Thus, the stringy substances flowed through the radiator screen device are oriented along the flowing direction of cooling air A.

The following will describe the function of the radiator screen device 40 having the wire 421 having substantially a triangular sectional shape, including a polygonal sectional shape, with reference to FIG. 11. As shown in FIG. 11, the triangular cross section of the wire 421 has a flat surface 421B directed against the flow of cooling air A. FIG. 11 shows a state in which the stringy substances D1 to D3 contained in cooling air A are captured by the wire 421. Cooling air A flowing at a high wind velocity of dozens of meters per second forces the stringy substances D1 to D3 against the flat surface 421B of the wire 421. Ends of the stringy substances D2, D3 that are free from being forced against the flat surface 421B are caused to vibrate by the cooling air A flowing at a high velocity. For example, the stringy substance D2 is cut at C2 by the effect of vibration and the cut piece D2A is flowed toward the radiator 35 (not shown). The cut piece D2A is oriented along the flowing direction as cooling air A. It is noted that the stringy substances in FIGS. 9 and 10 may also be cut by vibration and the stringy substances in FIGS. 10 and 11 may also slide off from the wire 421. Thus, the stringy substances flowed through the radiator screen device 40 are oriented along the flowing direction of cooling air A. The sectional shape of the wire 421 and which part of the sectional shape of the wire 421 is directed against the cooling air A are not limited to the examples shown in FIGS. 9 to 11.

Figure 12:
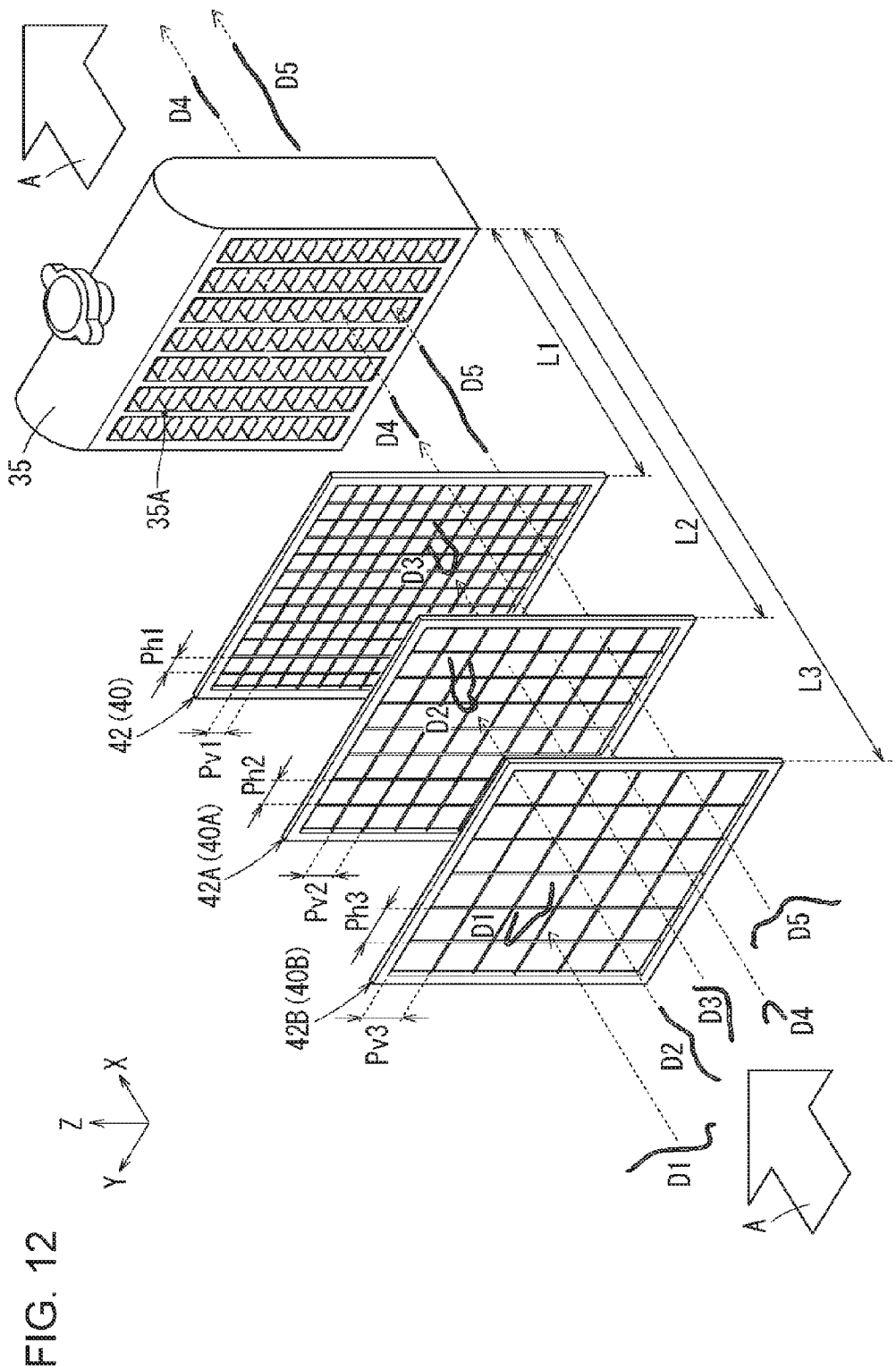
FIG. 12 is a perspective exploded view showing an example of a radiator screen unit having three bodies.

Referring to FIG. 12, a plurality of radiator screen devices 40, 40A, 40B with respective bodies 42, 42A, 42B having wires with different cross sectional shapes from one another may be provided upstream of the radiator 35, as shown in the drawing. For example, the body 42B of the radiator screen device 40B may be formed of wires having a sectional shape as shown in FIG. 11, the body 42A of the radiator screen device 40A formed of wires having a sectional shape as shown in FIG. 9, and the body 42 of the radiator screen device 40 formed of wires having a sectional shape shown in FIG. 10, respectively. As a matter of course, the bodies 42, 42A, 42B may be formed of wires having the same sectional shape. A radiator screen device may be formed of horizontal wires having a sectional shape shown in FIG. 10 and vertical wires having a sectional shape shown in FIG. 9. That is, wires of various sectional shapes may be used for a single radiator screen device.

Although the single radiator screen device 40 is disposed upstream of the radiator 35 as shown in FIG. 8, two or more radiator screen devices may be provided upstream of the radiator 35 as shown in FIG. 12. As shown in FIG. 12, the radiator screen devices 40, 40A, 40B are disposed upstream of the radiator 35 with the front surfaces of the respective radiator screen devices 40, 40A, 40B set parallel to the cooling air in-take surface 35A of the radiator 35. The radiator screen devices 40, 40A, 40B are disposed at spaced distances L1, L2, L3 from the radiator 35, respectively. The distances L1, L2, L3 from the radiator 35 may be appropriately set. In FIG. 12, the bodies 42, 42A, 42B are shown with the frames 41 of the respective radiator screen devices 40, 40A, 40B omitted from the illustration.

The radiator screen devices 40, 40A, 40B are made with the mesh sizes thereof increased toward the radiator 35. That is, the dimensions Ph2, Pv2 of the radiator screen device 40A are larger than the dimensions Ph1, Pv1 of the radiator screen device 40, respectively and the dimensions Ph3, Pv3 of the radiator screen device 40B are larger than the dimensions Ph2, Pv2 of the radiator screen device 40A, respectively. For example, for the stringy substances having a length of about 20 millimeters at maximum, Ph1, Pv1 for the radiator screen device 40 that is closest to the radiator 35 may be about six millimeters. Ph2, Pv2 for the radiator screen device 40A that is second closest to the radiator 35 may be about 15 millimeters. Ph3, Pv3 for the radiator screen device 40B that is farthest from the radiator 35 may be about 30 millimeters.

In the arrangement of FIG. 12 in which the mesh size of the radiator screen devices 40, 40A, 40B is reduced toward the radiator 35 and the cooling air A contains the stringy substances D1 to D5, as shown in the drawing, the stringy substance D1 is captured by the radiator screen device 40B, the stringy substance D2 is captured by the radiator screen device 40A, and the stringy substance D3 is captured by the radiator screen device 40, respectively. That is, part of the stringy substances are captured by any one of the radiator screen devices 40, 40A, 40B and the remaining stringy substances are oriented along the flowing direction of the cooling air A. The stringy substances D4, D5 that have been thus oriented and passed through the radiator screen devices 40, 40A, 40B are flowed through spaces between cooling fins of the radiator 35 by cooling air A flowing at a high wind velocity of dozens of meters per second.

In the arrangement of FIG. 12, since the stringy substances are captured by a plurality of different radiator screen devices, the time before the radiator screen devices 40, 40A, 40B are clogged or the time before overheat occurs may be further prolonged. As a result, operation time of an industrial vehicle may be further prolonged as compared with the arrangement shown in FIG. 8.

That is, a plurality of radiator screen devices is disposed upstream of the radiator and the plural radiator screen devices are made with the mesh sizes thereof increased toward the radiator. Thus, in a case in which part of stringy substances contained in cooling air is captured by the plural radiator screen devices dispersedly, the time before overheat occurs may be further prolonged or operation time of an industrial vehicle may be further prolonged.

According to the present invention, the industrial vehicle may include a fan disposed on the downstream side or on the upstream side of the radiator with respect to the flowing direction of cooling air to generate cooling air so that the time before overheat occurs is further prolonged or operation time of the industrial vehicle is further prolonged.

According to the present invention, the radiator screen devices 40, 40A, 40B, the radiator screen unit 55, and the forklift truck 1 as an industrial vehicle are not limited to the configurations, structures, appearances, shapes in the embodiments, but may be modified within the scope of the invention.

According to the present invention, the industrial vehicle in which the radiator screen device or the radiator screen unit is installed is not limited to a forklift truck, but may be used for various industrial vehicles having an internal combustion engine including a construction machine such as a power shovel and an agricultural machine such as a tractor.

The numeric values indicated in the above description of the embodiments of the present invention are merely examples, but may be modified.

What is claimed is:

1. A radiator screen device for a radiator of an industrial vehicle including a construction machine and an agricultural machine, comprising:
   at least one body formed of a wire and having a planar lattice structure, wherein the at least one body has such a size that covers a cooling air in-take surface of the radiator, the cooling air in-take surface being disposed on an upstream side of the radiator with respect to a flowing direction of cooling air, wherein the at least one body is disposed upstream of the radiator and faces the cooling air in-take surface, wherein the at least one body is configured to capture part of a plurality of stringy substances contained in the cooling air and orient lengthwise directions of remaining stringy substances along the flowing direction of the cooling air, wherein the at least one body includes a plurality of bodies with respective surfaces thereof set parallel to the cooling air in-take surface of the radiator, wherein the bodies are disposed at different distances from the radiator, and wherein the bodies are made with respective mesh sizes thereof decreased toward the radiator.

2. A radiator screen unit for a radiator of an industrial vehicle including a construction machine and an agricultural machine, comprising:
   a radiator screen device including at least one body formed of a wire and having a planar lattice structure, wherein the at least one body has such a size that covers a cooling air in-take surface of the radiator, the cooling air in-take surface being disposed on an upstream side of the radiator with respect to a flowing direction of cooling air, wherein the at least one body is disposed upstream of the radiator and faces the cooling air in-take surface, wherein the at least one body is configured to capture part of a plurality of stringy substances contained in the cooling air and orient lengthwise directions of remaining stringy substances along the flowing direction of the cooling air; and
   a fan disposed downstream of the radiator with respect to the flowing direction of cooling air to generate cooling air, wherein the at least one body includes a plurality of bodies with respective surfaces thereof set parallel to the cooling air in-take surface of the radiator, wherein the bodies are disposed at different distances from the radiator, and wherein the bodies are made with respective mesh sizes thereof decreased toward the radiator.

3. An industrial vehicle including a construction machine and an agricultural machine, comprising:
   a radiator;
   a radiator screen device including at least one body formed of a wire and having a planar lattice structure, wherein the at least one body has such a size that covers a cooling air in-take surface of the radiator, the cooling air in-take surface being disposed on an upstream side of the radiator with respect to a flowing direction of cooling air, wherein the at least one body is disposed upstream of the radiator and faces the cooling air in-take surface, wherein the at least one body is configured to capture part of a plurality of stringy substances contained in the cooling air and orient lengthwise directions of remaining stringy substances along the flowing direction of the cooling air; and a fan disposed downstream or upstream of the radiator with respect to the flowing direction of cooling air to generate cooling air, wherein the at least one body includes a plurality of bodies with respective surfaces thereof set parallel to the cooling air in-take surface of the radiator, wherein the bodies are disposed at different distances from the radiator, and wherein the bodies are made with respective mesh sizes thereof decreased toward the radiator.

* * * * *